United States Patent [19]
Phan

[11] Patent Number: 5,937,150
[45] Date of Patent: Aug. 10, 1999

[54] LCD PANEL CONTROLLED BY TWO PROCESS ELEMENTS

[75] Inventor: Tom Phan, Irvine, Calif.

[73] Assignee: Toshiba America Information Systems, Inc., Irvine, Calif.

[21] Appl. No.: 08/797,962

[22] Filed: Feb. 10, 1997

[51] Int. Cl.⁶ ..................................................... B41J 15/00
[52] U.S. Cl. ........................................ 395/114; 395/828
[58] Field of Search .................................. 395/101, 114, 395/115, 200, 275, 828; 345/115, 117, 173

[56] References Cited

U.S. PATENT DOCUMENTS

| | | | |
|---|---|---|---|
| 4,804,950 | 2/1989 | Moon et al. | 345/173 |
| 4,835,673 | 5/1989 | Rushby et al. | 364/200 |
| 4,964,154 | 10/1990 | Shimonoto | 379/100 |
| 4,992,884 | 2/1991 | Sakata | 358/401 |
| 5,021,892 | 6/1991 | Kita et al. | 358/468 |
| 5,121,113 | 6/1992 | Kedge et al. | 345/168 |
| 5,200,992 | 4/1993 | Yoshino | 379/93 |
| 5,235,674 | 8/1993 | Cohen-Skalli et al. | 395/101 |
| 5,239,627 | 8/1993 | Beck et al. | 395/275 |
| 5,323,393 | 6/1994 | Barett et al. | 370/85.8 |
| 5,361,134 | 11/1994 | Hu et al. | 358/296 |
| 5,392,131 | 2/1995 | Umeno | 358/403 |
| 5,396,342 | 3/1995 | Meyer | 358/406 |
| 5,412,779 | 5/1995 | Motoyama | 395/275 |
| 5,535,338 | 7/1996 | Krause et al. | 395/200.2 |
| 5,537,554 | 7/1996 | Motoyama | 395/280 |
| 5,537,559 | 7/1996 | Kane et al. | 395/375 |
| 5,537,626 | 7/1996 | Kraslavsky et al. | 395/828 |

OTHER PUBLICATIONS

Marketing documents related to RICOH Lan XP, Nov. 1996.
Marketing documents related to CANON GP 200F, Nov. 1996.
Marketing Documents related to CANON GP 30F, Nov. 1996.
Marketing documents related to: KONICA 7050, 7728, 9715FP, 9615FP, MD System, QScan Film Scanner, EV–Jetcolor, Nov. 1996.
Technical documents related to Multifunction Peripheral Interface Standard, Level 1, version 5.3, Apr. 9, 1996.

*Primary Examiner*—Amelia Au
*Assistant Examiner*—Samir Ahmed
*Attorney, Agent, or Firm*—Steven C. Sereboff; Arter & Hadden LLP

[57] ABSTRACT

A multifunction peripheral which can perform copying, printing, faxing and scanning. The MFP is made up of a hard output unit, essentially a copier, and a control unit, essentially a print server. User interface definitions for copying are embedded in the hard output unit. User interface definitions for printing, faxing and scanning are stored in the control unit. When the hard output unit resets, it loads the UI definitions from the control unit. The UI definitions in the control unit are stored as a file and are easily updated from a LAN.

20 Claims, 4 Drawing Sheets

LCD PANEL CONTROLLED BY TWO PROCESS ELEMENTS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to a multifunction peripheral (MFP), and more particularly to an MFP comprising a hard output unit having a display and a control unit.

2. Description of Related Art

One type of high output printer comprises a hard output unit and a control unit. The hard output unit typically comprises essentially a photocopier, and the control unit comprises a specialized server computer having a local area network (LAN) interface, an interface to the hard output unit, and hardware and software which permit users on the LAN to use the hard output unit. The hard output unit and the control unit are separate, although it is known to provide a LAN interface and a controller on a card which is installed in a copier. Without the control unit, the hard output unit is limited to functioning as a stand alone copier.

For a user interface (UI), the hard output unit includes an alphanumeric display, typically an LCD, and a user input means, such as panel buttons. The user may read various information from the display, and may use the user input means for controlling the operation of the hard output unit. The hard output unit includes a controller, such as a microprocessor and ROM, which store user interface programs and cause the display to display status and control information. In both printing and copying, the display is typically used to show information about the status of the copy or print job. In these typical systems, all of the UI controls are stored in and controlled by the hard output unit.

Because the printer can also copy, these devices are generally considered to be MFPs. More recently, it has become common to utilize MFPs to provide various functions such as printing, copying, scanning and faxing. If more functions and features are included in an MFP, its user interface generally becomes more complex.

It is therefore the object of the invention to provide an MFP comprising a hard output unit and a control unit. It is a further object of the invention to provide user interfaces for the MFP features in the hard output unit. It is a further object of the invention to provide a convenient means for revising UI definitions in the hard output unit.

SUMMARY OF THE INVENTION

The previously described objects are achieved in an MFP in which user interface (UI) definitions are distributed across a hard output unit and a control unit. User interface definitions for copying are embedded in the hard output unit, but the UI definitions for other functions are stored in the control unit. During initialization of the MFP, the control unit downloads its UI definitions to the hard output unit. The hard output unit stores these UI definitions in volatile memory such as RAM ands uses them during normal operations.

To update the UI for printing, faxing or other features, the new user interface definitions are simply loaded into the control unit and the hard output unit is reset. Loading may be from floppy disk, across a LAN or otherwise. Upgrading via the LAN is especially desirable when several of these MFPs are on the LAN—they can all be upgraded at the same time from a single workstation on the LAN.

Still further objects and advantages attaching to the device and to its use and operation will be apparent to those skilled in the art from the following particular description.

DESCRIPTION OF THE DRAWINGS

These and other advantages of the present invention are best understood with reference to the drawings, in which, in varying detail.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

Figure 1:
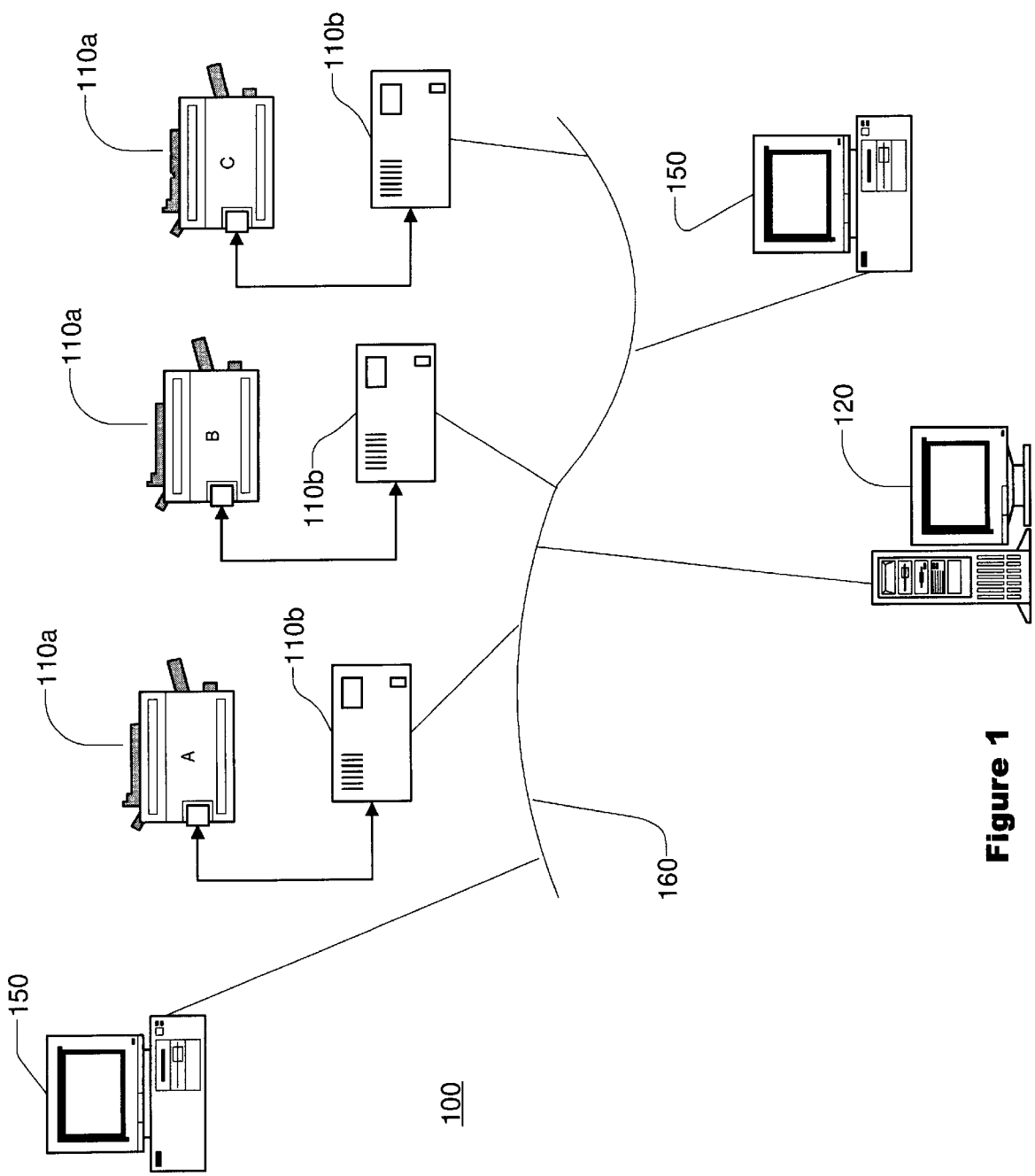
FIG. 1 is a block diagram of a LAN including plural MFPs in accordance with the invention.

Referring now to FIG. 1, there is shown a block diagram of a LAN 100 in accordance with the invention. The LAN 100 includes a file server 120, workstations 150, and MFPs 110 coupled to one another via network communications lines 160. The file server 120 and workstations 150 are preferably those well known in the art, such as computers having Intel Corporation (Santa Clara, Calif.) microprocessors and running Microsoft Corporation (Redmond, Wash.) Windows operating systems. The MFPs 110 preferably comprise a hard output unit 110a and a control unit 110b. The LAN 100 may also include hubs, routers and other devices (not shown).

Before proceeding to describe the LAN 100, a few terms are defined. By "file server," it is meant a computer which controls access to file and disk resources on a network, and provides security and synchronization on the network through a network operating system. By "server," it is meant hardware or software which provides network services. By "workstation," it is meant a client computer which routes commands either to its local operating system or to a network interface adapter for processing and transmission on the network. A workstation may function as a server by including appropriate software, and may be for example, a print server, archive server or communication server. By "software" it is meant one or more computer interpretable programs and modules related and preferably integrated for performing a desired function. A "multifunction peripheral" is a peripheral which provides the functions of more than one peripheral, and typically provides printing and at least one of: copying, scanning and faxing.

Figure 2:
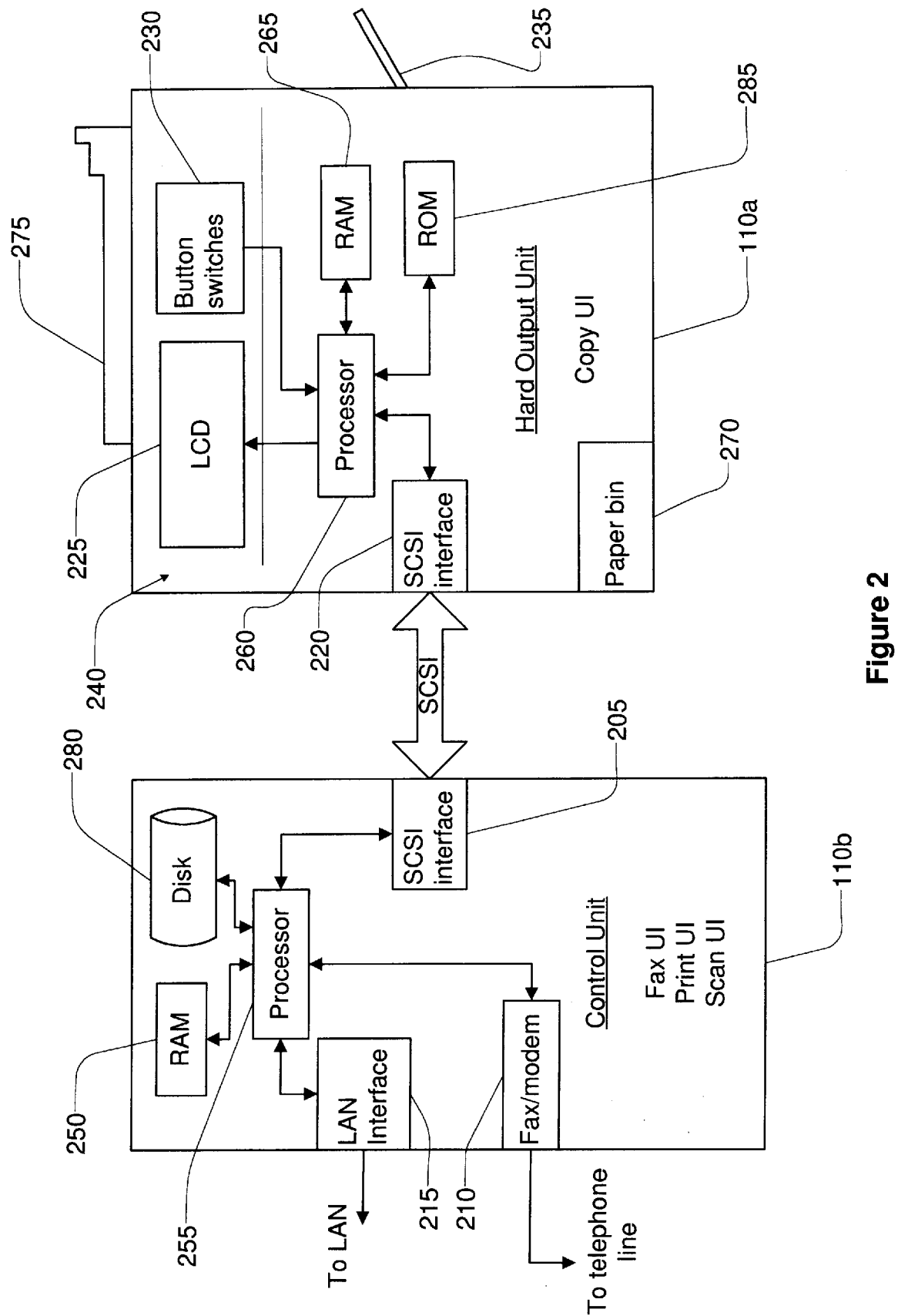
FIG. 2 is a block diagram of an MFP in accordance with the invention.

Turning now to FIG. 2, there is shown a block diagram of the hard output unit 110a and the control unit 110b. The hard output unit 110a preferably comprises a high output copier having a communications interface 220 (preferably SCSI) and a hardware and software interface which allows the hard output unit 110a to receive rasterized print jobs from the control unit 110b, manage the print jobs as well as its own copy jobs, and print the print jobs. The hardware includes a short term memory 265 (preferably RAM) and processor 260 in which programs are stored and run, respectively, for controlling the functions of the hard output unit 110a. The hard output unit preferably also includes a long term memory 285 such as a ROM or EPROM. The hard output unit 110a may also include a disk drive (not shown) for both long term and short term storage. The hard output unit 110a includes standard components including automatic document feeder 275, paper bin 270 and paper output tray 235.

The hard output unit 110a includes a non-fixed display 225, preferably an LCD, and user input device 230, such as button switches. The hard output unit 110a has user interface software stored in the memory 285 which is responsible for displaying information on the display 225 and interpreting user inputs from the user input device 230. The non-fixed display and user input device 230 comprise an operator console 240, which, together with the user interface software, comprise a UI subsystem.

Rather than hard-coding the particular information to be displayed and the interpretation of user inputs, this information is preferably stored separately from the user interface software as "user interface definitions." By "user interface," it is meant hardware and software that allow a user to interact with and perform operations.

The UI definitions preferably comprise a number of tables, with each table relating to a different function needing a user interface. Preferably, for displays, the tables include icons, messages, input-fields, rectangles, and pictures. Preferably, for user inputs, the tables include button switch mapping and subroutine identification. For example, for an icon, the UI definition includes an identifier, attributes, normal image, reverse image, normal size, reverse size. The attributes for an icon might include priority, whether the icon represents a "button" on the LCD, controls associated with the icon being touched, position, width, height, etc. For an input field, the UI definition includes an identifier, position, size, cursor position, alignment, font, attribute (off, normal, reverse, blink), start and end position of reverse area, default string, mode, minimum and maximum values, handling of illegal input, maximum string length, background color, cursor type, input method, increment/decrement method, increment/decrement quantities and control of increment/decrement. For a rectangle, the UI definition includes an identifier, position, width, height, line type, line thickness and color. For a message, the UI definition includes an identifier, a message string, font, length and position. For a picture, the UI definition includes identifiers of the other elements which together form the picture, plus an identifier and background color.

The hard output unit 111a stores user interface definitions for copying in the long term memory 285. The hard output unit 110a receives the user interface definitions for printing and faxing from the control unit 110b and stores these in the short term memory 265. Preferably, to enhance processing speed and programming ease, the hard output unit 110a also loads the copy UI definitions from the hard output unit's long term memory 285 to the short term memory 265.

The control unit 110b preferably comprises a server such as a computer having an Intel processor (255) and running Microsoft Windows NT. Preferably, there is a one-to-one correspondence between the control units 110b and hard output units 110a. In conjunction with the processor 255, the control unit 110b has a short term memory 250 (preferably RAM) and a long term memory 280 (preferably a hard disk) as known in the art. The control unit 110b further includes a communications interface 205 through which the control unit 110b communicates with the hard output unit 110a. Preferably, the communications interface 205 is configured as a SCSI host. The control unit 110b further preferably includes a fax/modem 210 for sending and receiving faxes via telephone lines. The control unit 110b includes management software stored in the long term memory 280 for managing print jobs, fax jobs and scan jobs. The control unit 110b rasterizes print jobs from the LAN 100 into print data (a form native to the hard output unit 110a) and transmits the print data to the hard output unit 110a via the SCSI interface 205.

Figure 3:
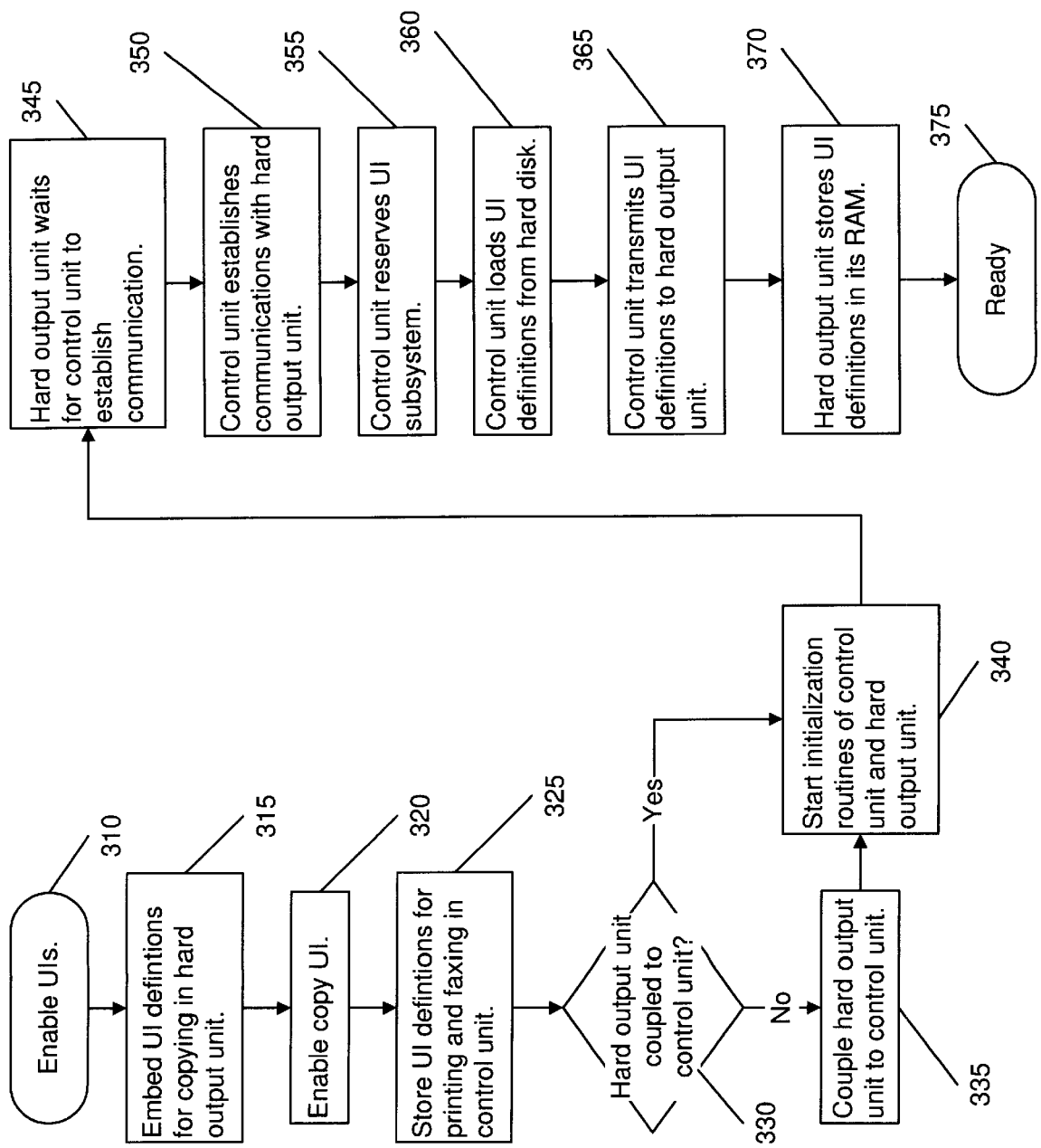
FIG. 3 is a flow chart of a method of user interface creation in accordance with the invention.

With reference to FIG. 3, the method of enabling UIs is described. In a first step, the process begins (step 310). Although shown as part of the process, the next several steps are better considered as preparatory steps. In the first preparatory step, UI definitions for copying are embedded in the hard output unit 110a (step 315). With the copy UI definitions in the hard output unit 110a, the copy UI may be enabled (step 320). These steps 315, 320 normally are performed during manufacturing of the hard output unit 110a. However, the copy UI definitions preferably may be field upgraded.

In addition, the copy UI definitions could be loaded from the control unit 110b in the same manner as other UI definitions. However, it is preferred to embed the copy UI definitions in the hard output unit 110a so that the hard output unit 110a may be used separately from the control unit 110b and function as a copier.

In the next preparatory step (step 325) the UI definitions for printing and faxing are stored in the control unit 110b. If the hard output unit 110a is not coupled to the control unit 110b (step 330), then the hard output unit 110a is coupled to the control unit 110b (step 335). This concludes the preparatory portion of the UI enablement process.

Once the UI definitions are stored respectively in the hard output unit 110a and control unit 110b, the UI definitions from the control unit 110b may be loaded to the hard output unit 110a as part of the MFP's initialization process. This is shown also in FIG. 3. However, it may also be desirable to force the UI definitions to be reloaded from the control unit 110b to the hard output unit 110a. Nonetheless, this normally may be done by reinitialization as described below.

Preferably, the hard output unit 110a and control unit 110b may be coupled when both are powered on and ready, and the SCSI protocol permits such a hot connection. The software in the hard output unit 110a and control unit 110b preferably can sense their connection and automatically transmit the print UI and fax UI from the control unit 110b to the hard output unit 110a.

In step 340, initialization routines in the hard output unit 110a and the control unit 110b are started. Such routines may address normal system maintenance, but also trigger UI definition loading in accordance with the invention. In step 345, the hard output unit 110a begins waiting for the control unit 110b to establish communication through the communications interfaces 205, 220. Next, the control unit 110b establishes communications with the hard output unit 110a (step 350). Preferably, this is done in accordance with the SCSI standard. Alternatively, the hard output unit 110a could establish communications with the control unit 110a. Furthermore, the hard output unit 110a and control unit 110b include timers such that after waiting a predetermined period of time, an error is presumed and reported.

In step 355, the control unit 110b reserves the UI subsystem. By reserving the UI subsystem, the control unit 110b will control what is displayed on the display 225 and how key presses on the user input 230 are handled.

In step 360, the control unit 110b loads the relevant UI definitions from its long term memory 280 to its short term memory 250. The UI definitions may be loaded in parts less than the whole. This step 360 is primarily to permit access to the UI definitions and may be achieved through alternative means as known in the art. Next, the control unit 110b transmits the UI definitions to the hard output unit 110a (step 365). Finally, the hard output unit 110a stores the transmitted UI definitions into its short term memory 265 (step 370). This concludes the UI enablement process (step 375).

In normal operation, when the hard output unit 110a needs a UI definition for printing, faxing or another function other than copying, these definitions are accessed from memory 265 in a manner similar to accessing the definitions for the copy UI.

Figure 4:
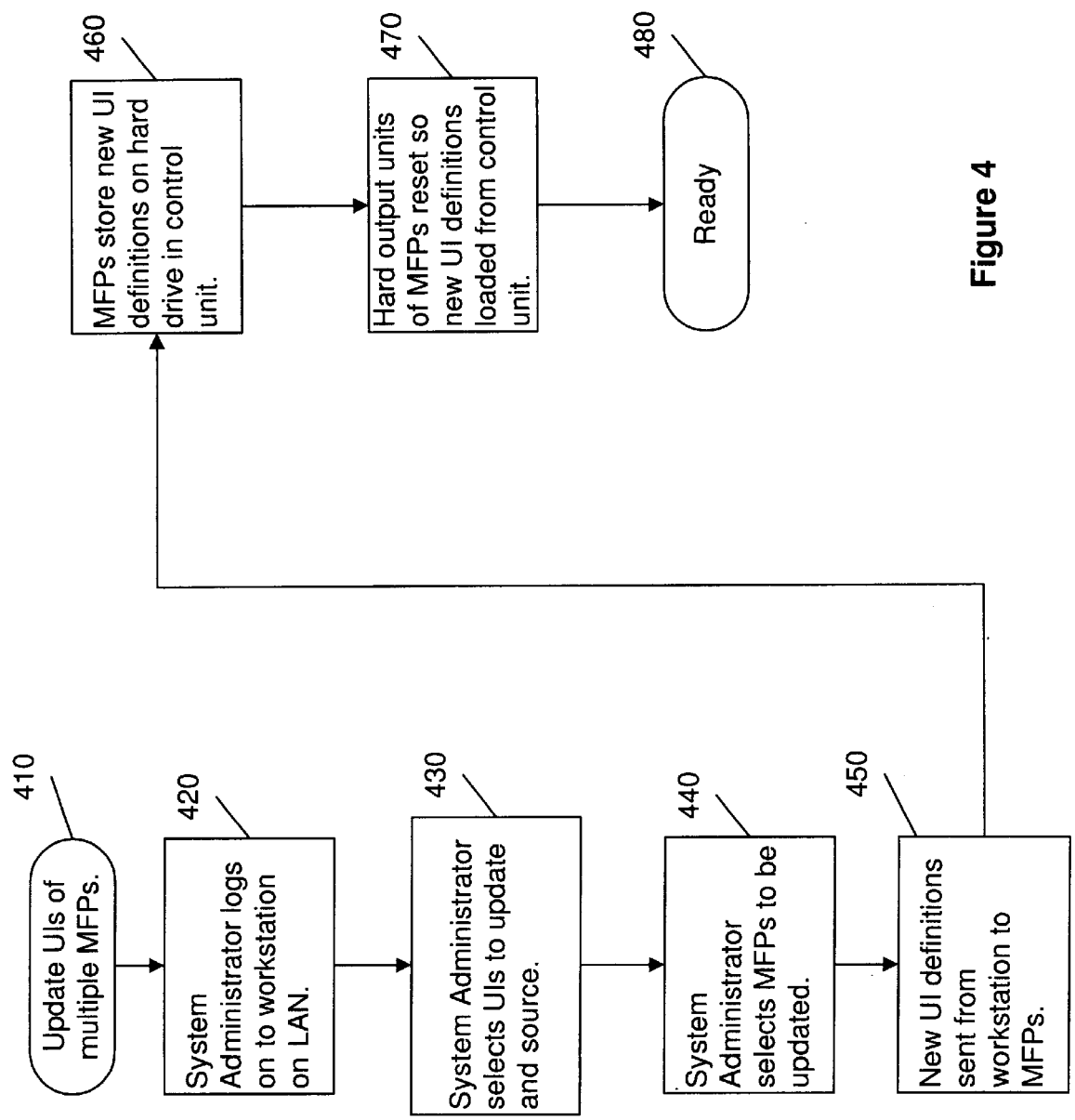
FIG. 4 is a flow chart of a method of updating user interface definitions of multiple MFPs from a network workstation.

Referring now to FIG. 4, the process for updating UIs of multiple MFPs 110 is described. The process for updating the UI definitions of a single MFP 110 is performed in a similar manner. In a first step, the process begins (step 410). Preferably, this process is initiated and controlled by a network administrator. Thus, the network administrator logs on to a workstation 150 on the LAN 100 and activates the appropriate software for updating UIs (step 420). Next, the network administrator selects which UIs to update, and the source of the new UI definitions (step 430). New UI definitions may be loaded from any of the sources known in the art, such as from a floppy disk, tape cartridge, LAN resource, Internet, etc.

In step 440, the network administrator selects which MFPs 110 are to receive the new UI definitions. Preferably the software displays the available MFPs 110 through a graphical, treed user interface on the network administrator's display. With the MFPs 110 and UI definitions selected, the software in the network administrator's workstation 150 simply sends the new UI definitions to the selected MFPs 110 via the network communications lines 160. More particularly, the new UI definitions are sent to the control units 110b of the selected MFPs 110.

The control units 110b then store the new UI definitions in their long term memories 280 (step 460). Finally, in step 470, the control units 110b send a reset signal to the hard output units 110a so that the hard output units 110a perform initialization as described above. This concludes the process for updating UIs of multiple MFPs (step 480).

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

I claim:

1. A method of providing user interface displays for a multifunction peripheral system, the multifunction peripheral system comprising a hard output unit communicatively coupled to a control unit, the control unit having a network adapter coupled to a computer network for receiving print and fax jobs from computers on the computer network, the hard output unit for performing a first peripheral function originated locally and a second peripheral function originated from the computer network via the control unit, the hard output unit including a display and a processor, memory, user interface software for controlling the display, and first user interface definitions for the first peripheral function fixed in the memory of the hard output unit; the method comprising the steps of:

storing second user interface definitions for the peripheral function in the control unit, wherein the control unit receives the second user interface definitions from a source other than the hard output unit;

during an initialization process between the control unit and the hard output unit, downloading the second user interface definitions from the control unit to the hard output unit;

storing the second user interface definitions for the second peripheral function in the hard output unit, whereby the first user interface definitions are unaffected;

during use of the hard output unit, if a user desires to use the first peripheral function, then using the first user interface definitions for the first peripheral function stored in the hard output unit; and during use of the hard output unit, if a user desires to use the second peripheral function, then using the second user interface definitions for the second peripheral function stored in the hard output unit, wherein the hard output unit can perform the first peripheral function irrespective of whether the second user interface definition has bee stored in the hard output unit; and the first peripheral function comprisingly copying of documents using only the hard output unit;

the second peripheral function comprising printing, when the multifunction peripheral processes a print job, the control unit rasterizes the print job and then transmits the rasterized print job to the hard output unit.

2. The method of providing user interface displays for a multifunction peripheral system as set forth in claim 1, wherein the hard output unit stores the second user interface definitions from the control unit in volatile memory.

3. The method of providing user interface displays for a multifunction peripheral system as set forth in claim 2, wherein the hard output unit stores the second user interface definitions from the control unit in RAM.

4. The method of providing user interface displays for a multifunction peripheral system as set forth in claim 1 further comprising the step of updating the second user interface definitions for the second peripheral function by loading third user interface definitions for the second peripheral function into the control unit and reinitializing the hard output unit.

5. The method of providing user interface displays for a multifunction peripheral system as set forth in claim 4 wherein the third user interface definitions are loaded to the control unit from a removable storage medium in the control unit.

6. The method of providing user interface displays for a multifunction peripheral system as set forth in claim 5 wherein the third user interface definitions are loaded to the control unit from the computer network.

7. The method of providing user interface displays for a multifunction peripheral system as set forth in claim 6 wherein the third user interface definitions are loaded in response to at least one command by a user at a workstation on the computer network.

8. A method of loading a first user interface definition for a first peripheral function of a multifunction peripheral system coupled to a LAN, the LAN including a workstation and a file server, the multifunction peripheral system comprising a control unit and a hard output unit, the control unit comprising a server computer communicatively coupled to the hard output unit, the hard output unit comprising a device for generating hard output for the first peripheral function and a second peripheral function, the second peripheral function comprising job processing performed only by the hard output unit, the hard output unit including a relatively unchangeable second user interface definition for the second peripheral function, the method comprising the steps of:

(a) logging on to the LAN from the workstation and activating user interface definition update software;

(b) from the workstation, selecting a source of the first user interface definition, wherein the source is either on the workstation or the file server;

(c) from the workstation, selecting the first user interface definition from the source;

(d) loading the first user interface definition from the source to a long term memory in the control unit;

(e) loading the first user interface definition from the long term memory in the control unit to a short term memory in the control unit;

(f) enabling communication between the control unit and the hard output unit;

(g) transmitting the first user interface definition from the short term memory in the control unit to a short term memory in the hard output unit, whereby the second user interface definition is unaffected;

wherein the hard output unit can perform the second peripheral function irrespective of whether the first user interface definitions have been stored in the hard output unit; and the first peripheral function comprising copying of documents using only the hard output unit;

the second peripheral function comprising printing;

when the multifunction peripheral processes a print job, the control unit rasterizes the print job and then transmits the rasterized print job to the hard output unit.

9. The method of loading a first user interface definition for a multifunction peripheral system as set forth in claim 8 further comprising the step of selecting plural multifunction peripheral systems to receive the first user interface definition, and loading the first user interface to the selected multifunction peripheral systems as set forth in steps (d) through (g) of claim 8.

10. A multifunction peripheral system comprising:

(a) a hard output unit comprising a paper tray, a non-fixed display, a user input device, a processor, a first memory for long term storage and a second rewritable memory for short term storage, a communications interface and first user interface software stored in the first memory for controlling the display and the user input device in accordance with user interface definitions, the hard output unit for providing first and second peripheral functions, wherein displays on the display panel are generated by the processor according to the user interface software, the first memory including a first user interface definition for the first peripheral function;

(b) a control unit comprising a processor, a first rewritable memory for long term storage and a second rewritable memory for short term storage, a communications interface coupled to the communications interface of the hard output unit, a fax/modem, a network adapter for communicating with a computer network, and a second user interface definition stored in the first memory for the second peripheral function, wherein (i) without affecting the first user interface definition, the processor of the control unit can upload the second user interface definition to the hard output unit via the communications interface of the control unit for user interaction with the hard output unit through the display and user input device for the second peripheral functions;

wherein the first and second user interface definitions include messages, input-fields and user input device mappings;

the hard output unit can perform the second peripheral function irrespective of whether the first user interface definitions have been stored in the hard output unit;

the first peripheral function comprises copying in documents using only the hard output unit;

the second peripheral function comprises printing;

when the multifunction peripheral processes a print job, the control unit rasterizes the print job and then transmits the rasterized print job to the hard output unit.

11. The multifunction peripheral system as set forth in claim 10 wherein the hard output unit comprises a photocopier having a high speed electronic communications interface.

12. The multifunction peripheral system as set forth in claim 10 wherein the control unit comprises a personal computer.

13. The method of providing user interface displays for a multifunction peripheral system as set forth in claim 1 further comprising the steps of:

storing the third user interface definitions for a third peripheral function in the control unit, the third peripheral function including user selection of a job destination from the hard output unit and communication of the job to the job destination by the control unit;

downloading the third user interface definitions for the third peripheral function from the control unit to the hard output unit;

storing the third user interface definitions for the third peripheral function in the hard output unit;

during use of the hard output unit, if a user desires to use the third peripheral function, then using the third user interface definitions for the third peripheral function stored in the hard output unit.

14. The method of providing user interface displays for a multifunction peripheral system as set forth in claim 1, wherein the user interface definitions comprise plural tables, wherein each table relates to a given function of the multifunction peripheral system.

15. The method of providing user interface displays for a multifunction peripheral system as set forth in claim 14, wherein the tables include icons, messages, input-fields, rectangles, and pictures.

16. The method of providing user interface displays for a multifunction peripheral system as set forth in claim 14, wherein the tables include button switch mapping and subroutine identification.

17. The method of providing user interface displays for a multifunction peripheral system as set forth in claim 1, wherein the step of using the second user interface definitions for the second peripheral function stored in the hard output unit comprises displaying display information from the second user interface definition for the second peripheral function on the display, displaying status information regarding a second peripheral job initiated by the user in accordance with the second user interface definitions.

18. The method of providing user interface displays for a multifunction peripheral system as set forth in claim 1 wherein the first peripheral function is copying and the second peripheral function is printing.

19. The method of loading a first user interface definition for a first function of a multifunction peripheral system coupled to a LAN as set forth in claim 8 wherein the first peripheral function is printing and the second peripheral function is copying.

20. The multifunction peripheral system of claim 10 wherein the first peripheral function is copying and the second peripheral function is printing.

* * * * *